(12) United States Patent
Gocha et al.

(10) Patent No.: US 10,428,987 B2
(45) Date of Patent: Oct. 1, 2019

(54) QUICK CONNECT ASSEMBLY

(71) Applicant: Cooper-Standard Automotive Inc., Novi, MI (US)

(72) Inventors: Kenneth Gocha, Flint Township, MI (US); Gary Klinger, Rochester Hills, MI (US); Steve Frederiksen, Flat Rock, MI (US)

(73) Assignee: COOPER-STANDARD AUTOMOTIVE INC., Novi, MI (US)

( * ) Notice: Subject to any disclaimer, the term of this patent is extended or adjusted under 35 U.S.C. 154(b) by 307 days.

(21) Appl. No.: 15/037,716

(22) PCT Filed: Dec. 2, 2014

(86) PCT No.: PCT/US2014/068044
§ 371 (c)(1),
(2) Date: May 19, 2016

(87) PCT Pub. No.: WO2015/084782
PCT Pub. Date: Jun. 11, 2015

(65) Prior Publication Data
US 2016/0298800 A1    Oct. 13, 2016

Related U.S. Application Data

(60) Provisional application No. 61/910,555, filed on Dec. 2, 2013, provisional application No. 61/972,369, filed on Mar. 30, 2014.

(51) Int. Cl.
*F16L 37/088* (2006.01)
*F16L 37/14* (2006.01)

(52) U.S. Cl.
CPC .......... *F16L 37/144* (2013.01); *F16L 37/088* (2013.01); *F16L 2201/10* (2013.01)

(58) Field of Classification Search
CPC .... F16L 37/088; F16L 37/0841; F16L 37/144
(Continued)

(56) References Cited

U.S. PATENT DOCUMENTS 6,540,263 B1    4/2003  Sausner
7,823,930 B2 *  11/2010 Feger ................... F16L 37/144
                                                          285/23

(Continued)

FOREIGN PATENT DOCUMENTS

CN    1894533 A    1/2007
CN    102918316 A  2/2013
(Continued)

OTHER PUBLICATIONS

JP 2009257583 A translation (Year: 2009).*
(Continued)

*Primary Examiner* — Aaron M Dunwoody
(74) *Attorney, Agent, or Firm* — Stephen T. Olson; Harness, Dickey & Pierce, P.L.C.

(57) ABSTRACT

A fluid quick connector assembly (20) according to an exemplary embodiment of this disclosure, among other possible things includes a housing (22) having a passage (32) configured to receive an endform (26), and a retainer (24) including a bridge (68). A beam (78) extends from the bridge. Two retainer arms (70) extend from the bridge to retain the male endform (26) in the passage of the housing when the retainer is in an engaged position. Two guiding legs (72) extend from the bridge that guide the retainer (24) during movement to the engaged position. The bridge (68), the beam (78), the two retainer arms (70), and the two guiding legs (72) are an integral unitary single piece component, and the beam (78) contacts the endform (26) when the retainer (24) is in the engaged position.

20 Claims, 17 Drawing Sheets

(58) Field of Classification Search
USPC .................................................. 285/319, 305
See application file for complete search history.

(56) References Cited

U.S. PATENT DOCUMENTS

| | | | | |
|---|---|---|---|---|
| 8,113,549 | B2* | 2/2012 | Bokuhn | F16L 37/144 285/305 |
| 8,408,604 | B2* | 4/2013 | Yamada | F16L 37/133 285/305 |
| 9,915,388 | B2* | 3/2018 | Hatanaka | F16L 37/144 |
| 2002/0084652 | A1* | 7/2002 | Halbrock | F16L 37/144 285/305 |
| 2004/0036283 | A1* | 2/2004 | Furuya | F16L 37/1225 285/305 |
| 2012/0326435 | A1* | 12/2012 | Okazaki | F16L 37/088 285/84 |
| 2014/0319820 | A1* | 10/2014 | Takimoto | F16L 37/088 285/148.21 |
| 2014/0339821 | A1* | 11/2014 | Ishizaka | F16L 37/12 285/319 |
| 2016/0040813 | A1* | 2/2016 | Hatanaka | F16L 37/144 285/93 |
| 2017/0067588 | A1* | 3/2017 | Chaupin | F16L 37/088 |
| 2017/0146173 | A1* | 5/2017 | Chaupin | F16L 37/1225 |

FOREIGN PATENT DOCUMENTS

| | | |
|---|---|---|
| DE | 19946260 C1 | 1/2001 |
| EP | 1087169 A2 | 3/2001 |
| EP | 1369634 A1 | 12/2003 |
| JP | 2004-251319 A | 9/2004 |
| JP | 4236952 B2 | 3/2009 |
| JP | 2009257583 A | 11/2009 |
| JP | 2011174508 A | 9/2011 |
| JP | 2013133915 A | 7/2013 |
| WO | 2009/119058 A1 | 10/2009 |
| WO | PCT/JP2012/083533 | * 12/2012 |

OTHER PUBLICATIONS

International Search Report and Written Opinion for International Application No. PCT/US2014/068044 dated Feb. 23, 2015.
International Preliminary Report on Patentability for International Application No. PCT/US2014/068044 dated Jun. 16 2016.
Office Action dated Apr. 12, 2017 in corresponding Chinese Patent Application No. 201480065822.6. Partial Translation provided by CCPIT Patent and Trademark Law Offices.
Office Action dated Sep. 4, 2018 in corresponding Japanese Patent Application No. 2016-535654. Translation provided by Miyoshi & Miyoshi Patent Attorneys.

* cited by examiner

QUICK CONNECT ASSEMBLY

REFERENCE TO RELATED APPLICATIONS

This application is a United Sates National Phase application of PCT Application No PCT/US2014/068044 filed on Dec. 2, 2014, which claims priority to U.S. Provisional Application No. 61/972,369 filed Mar. 30, 2014 and U.S. Provisional Application No. 61/910,555 filed Dec. 2, 2013.

BACKGROUND OF THE INVENTION

A quick connect assembly is employed to releasably retain an endform in a housing with a retainer. Quick connect assemblies can be used in fluid systems. Prior quick connect assemblies include a separate latch and a separate verifier to verify that the endform is properly secured by the latch.

SUMMARY OF THE INVENTION

A fluid quick connector assembly according to an exemplary embodiment of this disclosure, among other possible things includes a housing having a passage configured to receive an endform, and a retainer including a bridge. A beam extends from the bridge. Two retainer arms extend from the bridge to retain the male endform in the passage of the housing when the retainer is in an engaged position. Two guiding legs extend from the bridge that guide the retainer during movement to the engaged position. The bridge, the beam, the two retainer arms, and the two guiding legs are an integral unitary single piece component, and the beam contacts the endform when the retainer is in the engaged position.

In a further embodiment of the foregoing fluid quick connector assembly, the endform includes a tubular body having an annular bead, and the beam is positioned axially forward of the annular bead when the retainer is in the engaged position to provide a redundant latch.

In a further embodiment of any of the foregoing fluid quick connector assemblies, the beam has a curved lower surface.

In a further embodiment of any of the foregoing fluid quick connector assemblies, the housing includes a first portion, a second portion, and a third portion. The first portion and the second portion are connected by first flanges with a first space defined therebetween. The second portion and the third portion are connected by second flanges with a second space defined therebetween. The two retainer arms are received in the first space, and the two guiding legs are received in second space.

In a further embodiment of any of the foregoing fluid quick connector assemblies, the second portion of the housing includes a stop and the two retainer arms each include a hooked projection that engages the stop of the housing to prevent the retainer from moving to the engaged position.

In a further embodiment of any of the foregoing fluid quick connector assemblies, the two retainer arms of the retainer each include an upset encountering tab, and an annular bead of the endform engages the upset encountering tabs to bias the two retainer arms outwardly to remove the hooked projections from the stop to allow the retainer to move to the engaged position.

In a further embodiment of any of the foregoing fluid quick connector assemblies, when the retainer is in the engaged position, the two retainer arms bias inwardly to secure the endform in the housing.

In a further embodiment of any of the foregoing fluid quick connector assemblies, the second portion of the housing includes a first detent and the two retainer arms of the retainer includes a second detent. The first detent and the second detent engage to prevent removal of the retainer from the housing when the retainer is in the engaged position.

In a further embodiment of any of the foregoing fluid quick connector assemblies, the two guiding legs each include an upper detent, a lower detent, and a middle detent located therebetween, In a further embodiment of any of the foregoing fluid quick connector assemblies, when the retainer is in a service position, the first flanges are located between the middle detent and the lower detent, when the retainer is in a shipping position, the first flanges are located between the middle detent and the upper detent, and when the retainer is in the engaged position, the upper detent is received in the slot of the first flange.

In a further embodiment of any of the foregoing fluid quick connector assemblies, each of the two retainer arms includes a chamfered inner surface that is engaged by the annular bead of the endform.

A fluid quick connector assembly according to an exemplary embodiment of this disclosure, among other possible things includes an endform including a tubular body having an annular bead. A housing has a passage configured to receive the endform. The housing includes a first portion, a second portion, and a third portion. The first portion and the second portion are connected by first flanges with a first space defined therebetween. The second portion and the third portion are connected by second flanges with a second space defined therebetween. A retainer includes a bridge. A beam extends from the bridge. The beam has a curved lower surface. The retainer includes two retainer arms extending from the bridge to retain the male endform in the passage of the housing when the retainer is in an engaged position. Two guiding legs extend from the bridge that guide the retainer during movement to the engaged position. The bridge, the beam, the two retainer arms, and the two guiding legs are an integral unitary single piece component. The beam contacts the endform when the retainer is in the engaged position. The beam is positioned axially forward of the annular bead when the retainer is in the engaged position to provide a redundant latch. The two retainer arms are received in the first space of the housing, and the two guiding legs are received in second space of the housing.

In a further embodiment of the foregoing fluid quick connector assembly, the second portion of the housing includes a stop and the two retainer arms each include a hooked projection that engages the stop of the housing to prevent the retainer from moving to the engaged position.

In a further embodiment of any of the foregoing fluid quick connector assemblies, the two retainer arms of the retainer each include an upset encountering tab, and an annular bead of the endform engages the upset encountering tabs to bias the two retainer arms outwardly to remove the hooked projections from the stop to allow the retainer to move to the engaged position.

In a further embodiment of any of the foregoing fluid quick connector assemblies, when the retainer is in the engaged position, the two retainer arms bias inwardly to secure the endform in the housing.

In a further embodiment of any of the foregoing fluid quick connector assemblies, the second portion of the housing includes a first detent and the two retainer arms of the retainer includes a second detent, and the first detent and the second detent engage to prevent removal of the retainer from the housing when the retainer is in the engaged position.

In a further embodiment of any of the foregoing fluid quick connector assemblies, the two guiding legs each include an upper detent, a lower detent, and a middle detent located therebetween, In a further embodiment of any of the foregoing fluid quick connector assemblies, when the retainer is in a service position, the first flanges are located between the middle detent and the lower detent, when the retainer is in a shipping position, the first flanges are located between the middle detent and the upper detent, and when the retainer is in the engaged position, the upper detent is received in the slot of the first flange.

In a further embodiment of any of the foregoing fluid quick connector assemblies, each of the two retainer arms includes a chamfered inner surface that is engaged by the annular bead of the endform.

DETAILED DESCRIPTION OF THE PREFERRED EMBODIMENT

Figure 1:
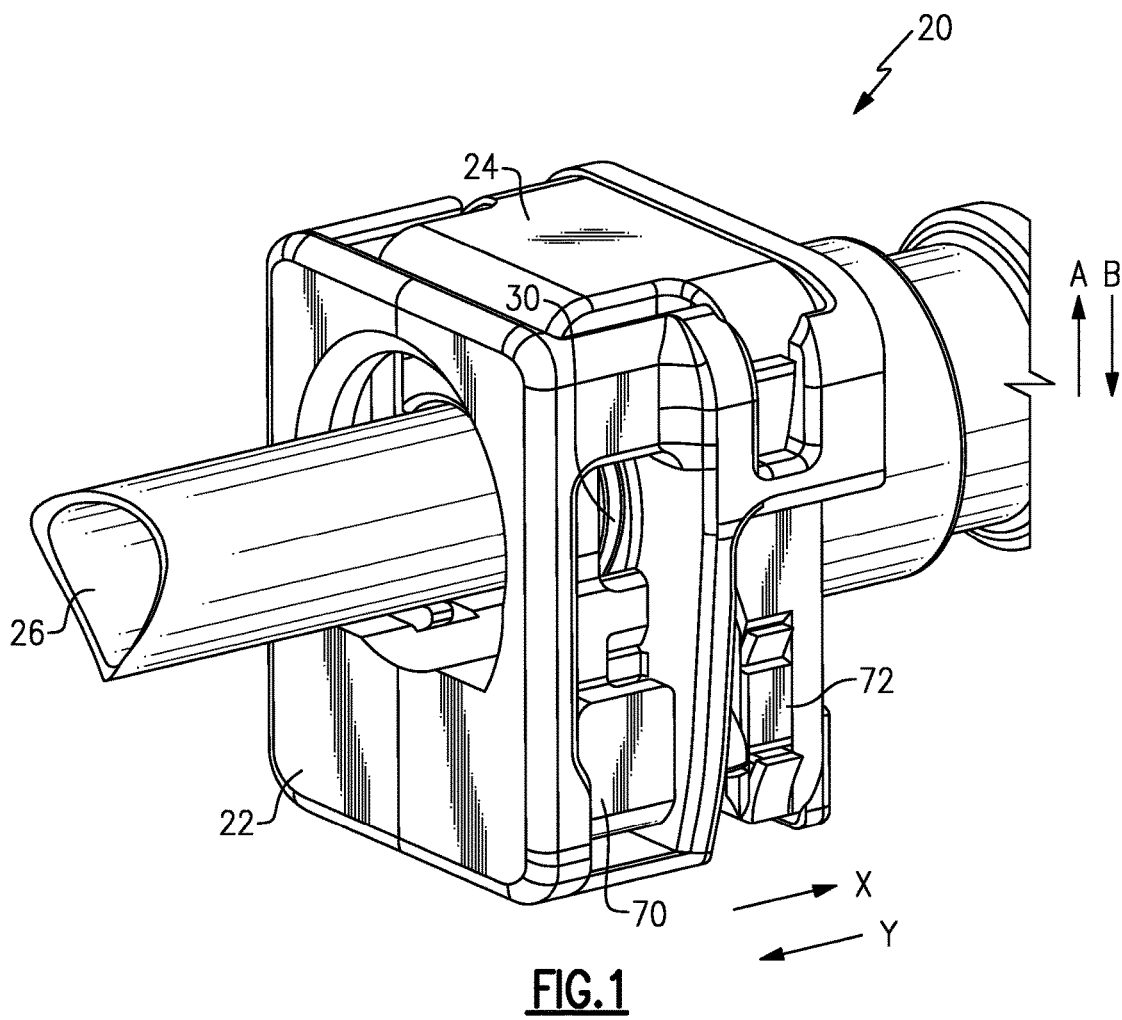
FIG. 1 illustrates a perspective view of a quick connect assembly in an engaged position.

FIG. 1 illustrates a quick connect assembly 20. The quick connect assembly 20 includes a housing 22, a retainer/verifier 24, and an endform 26. The retainer/verifier 24 retains the endform 26 in the housing 22. The direction forward is defined as the direction X, and the direction rearward is defined as the direction Y. The direction upward is defined as the direction A, and the direction downward is defined as the direction B.

Figure 2:
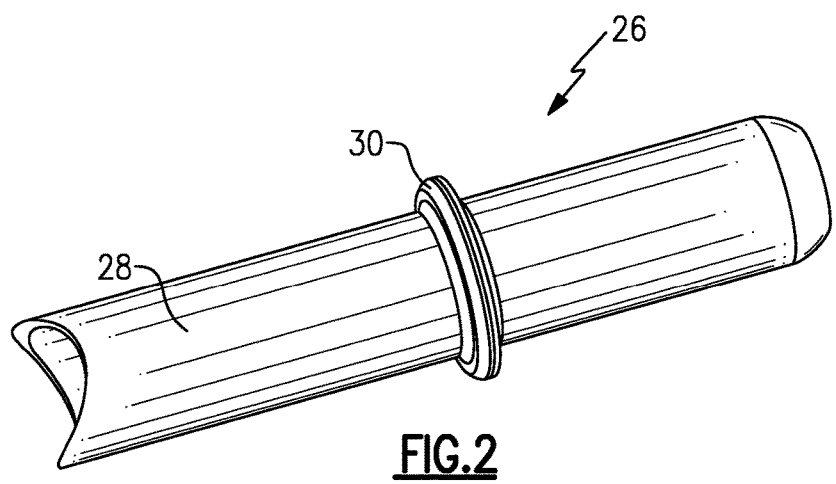
FIG. 2 illustrates a perspective view of an endform.

As shown in FIG. 2, the endform 26 includes a tubular body 28 and an annular bead 30 that circumferentially surrounds from the tubular body 28.

Figure 3:
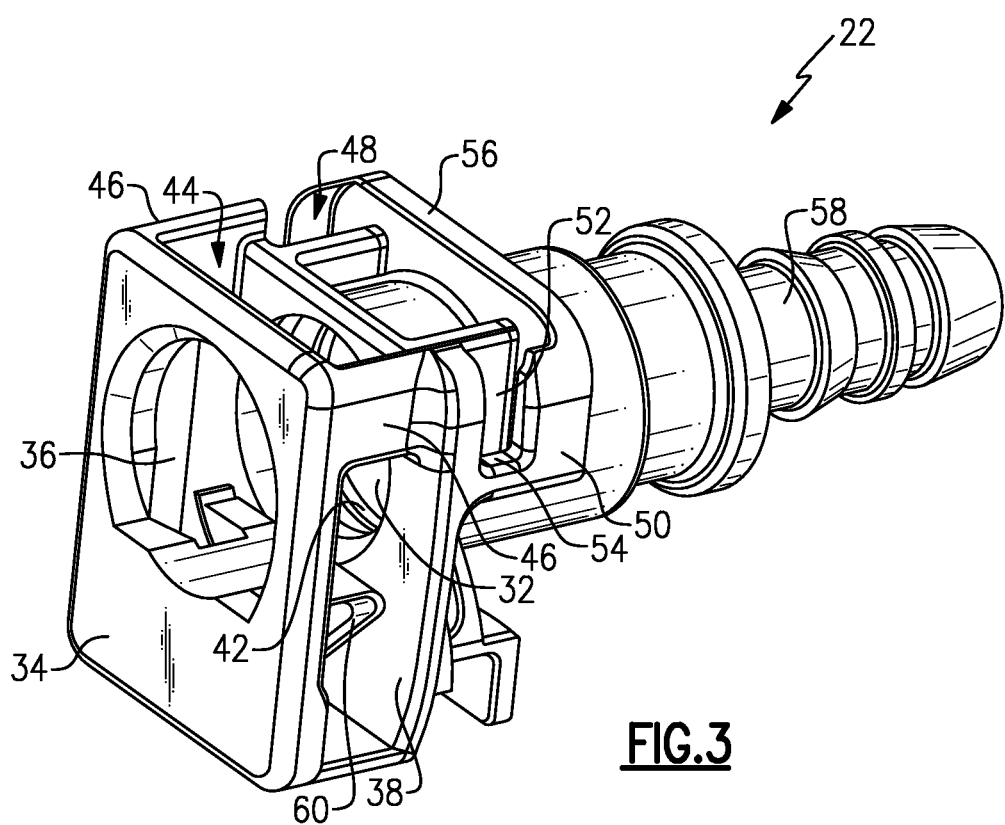
FIG. 3 illustrates a perspective view of a housing.
Figure 4:
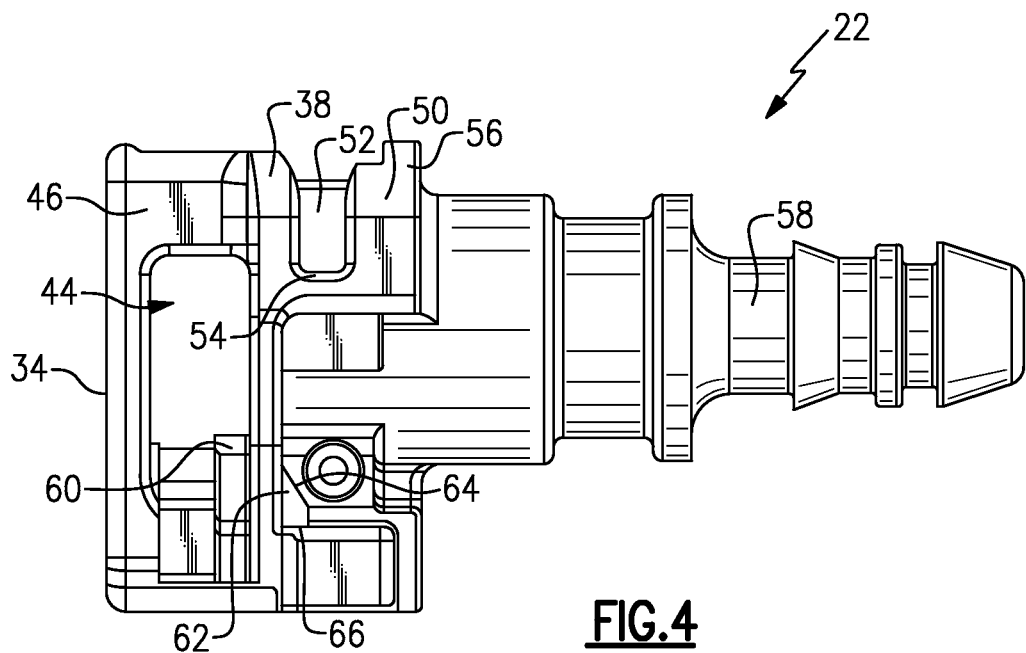
FIG. 4 illustrates a side view of the housing.
Figure 5:
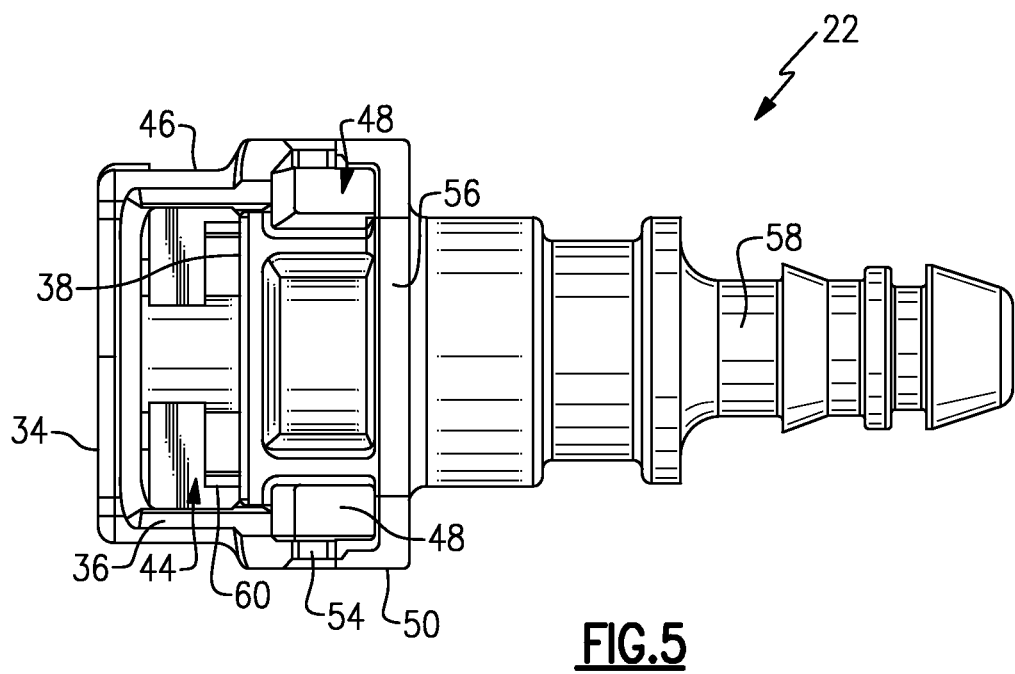
FIG. 5 illustrates a top view of the housing.
Figure 6:
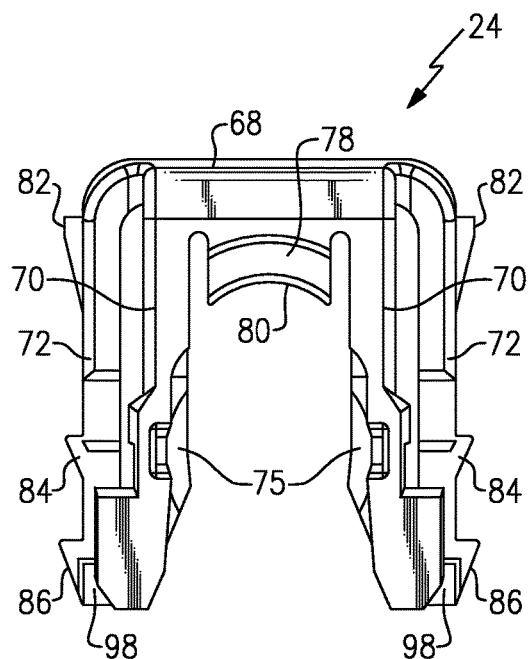
FIG. 6 illustrates a front view of a retainer/verifier.
Figure 7:
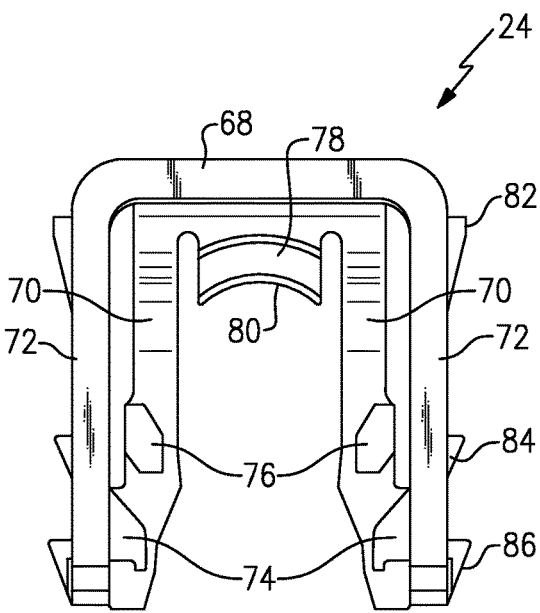
FIG. 7 illustrates a rear view of the retainer/verifier.
Figure 8:
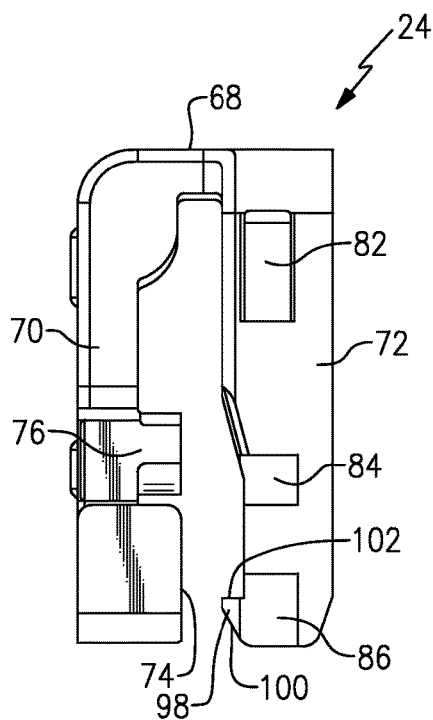
FIG. 8 illustrates a side view of the retainer/verifier.
Figure 9:
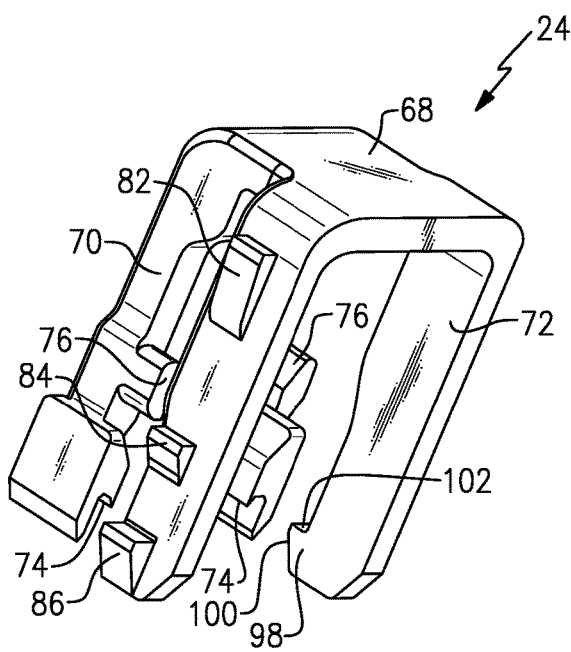
FIG. 9 illustrates a perspective view of the retainer/verifier.

FIGS. 3, 4 and 5 illustrate the housing 22. The housing 22 includes a stem 58 that is receivable in a plastic tube or a rubber hose (not shown). The housing 22 includes a passage 32 that receives the endform 26. The housing 22 includes a first portion 34 having a first opening 36 and a second portion 38 having a second opening 42 aligned with the first opening 36 and the passage 32. The first portion 34 is positioned axially in front of the second portion 38 and attached to the second portion 38 by flanges 46. A space 44 is defined between the first portion 34 and the second portion 38. Flanges 50 extend behind the second portion 38 and are attached to a third portion 56 to define a space 48 on each side of the passage 32 between the second portion 38 and the third portion 56. An outer surface of each flange 50 includes a slot 52 that extends downwardly to a lower surface 54.

A stop 60 is located on a front surface of the second portion 38 in the space 44 and includes a projection 69 on each upper corner of the stop 60. A substantially triangular detent 62 is located on a back side of the second portion 38 on each side of passage 32 near a bottom of the housing 22. Each detent 62 includes a locking surface 66 that is substantially perpendicular to the second portion 38 and a ramped surface 64 that extends upwardly to the second portion 38. The locking surface 66 is located below the ramped surface 64.

The retainer/verifier 24 is a single, integral, unitary, monolithic component. The retainer/verifier 24 includes an upper flange 68, two retainer arms 70 extending downwardly from the upper flange 68, and two guiding legs 72 extending downwardly from the upper flange 68. The two retainer arms 70 are located in front of and inwardly of the guiding legs 72.

The two retainer arms 70 each include a chamfered surface 75 on a front inner surface of each retainer arm 70 that can be engaged by the bead 30 of the endform 26 when inserted into the passage 32 of the housing 22. A back surface of each of the two retainer arms 70 include a hooked projection 74 each having a recess 71 located at a bottom. An upset encountering tab 76 is located above each hooked projection 74. A beam 78 having a curved lower surface 80 extends downwardly from the upper flange 68 in between of the two retainer arms 70.

The two guiding legs 72 each include an outer side surface having a first detent 82, a second detent 84 and a third detent 86. The first detent 82 is located near the upper flange 68, the third detent 86 is located near an end of each leg 72, and the second detent 84 is located between the first detent 82 and the third detent 86.

A front surface of each guiding leg 72 includes a substantially triangular detent 98 near a bottom of each guiding leg 72. The detent 98 includes a ramped surface 100 and a locking surface 102 that is substantially perpendicular to the guiding leg 72. The locking surface 102 is located above the ramped surface 100, and the ramped surface extends downwardly towards an end of each guiding leg 72.

Figure 10:
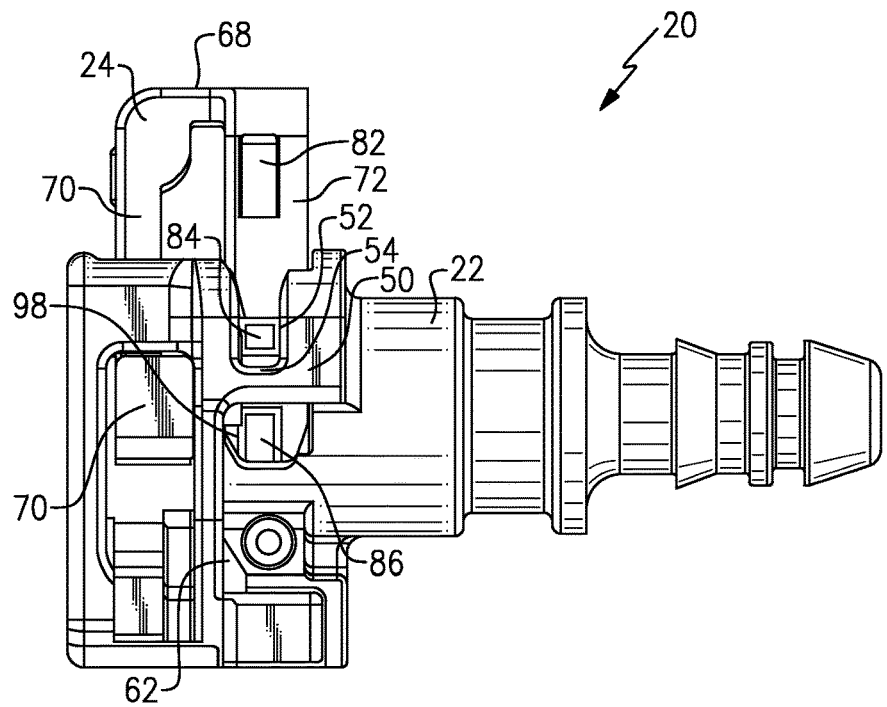
FIG. 10 illustrates a side view of the quick connect assembly in a service position.
Figure 11:
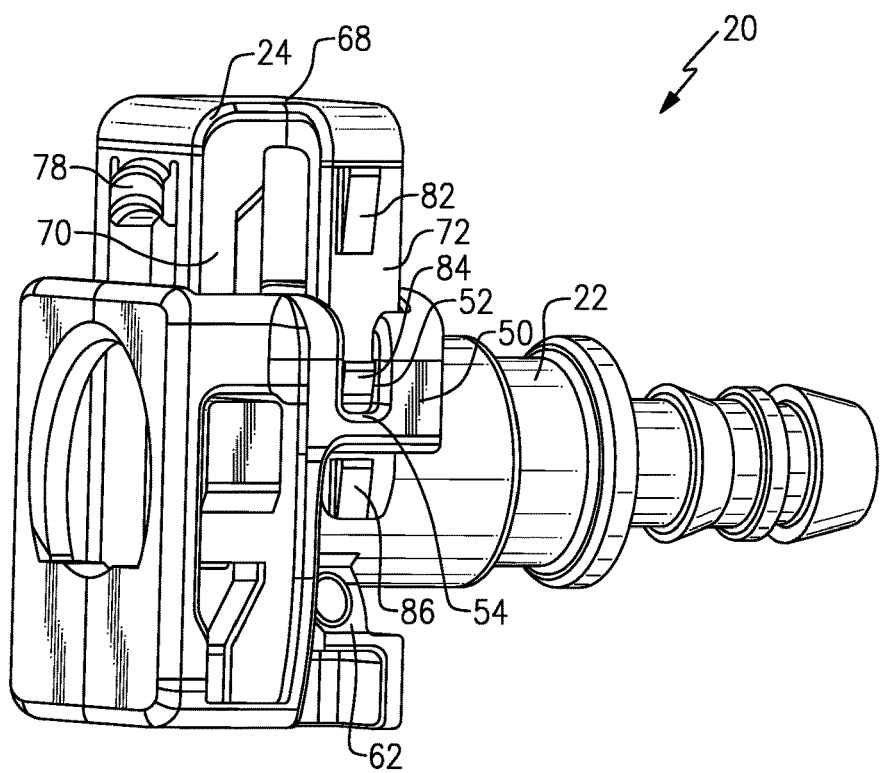
FIG. 11 illustrates a perspective view of the quick connect assembly in the service position.
Figure 12:
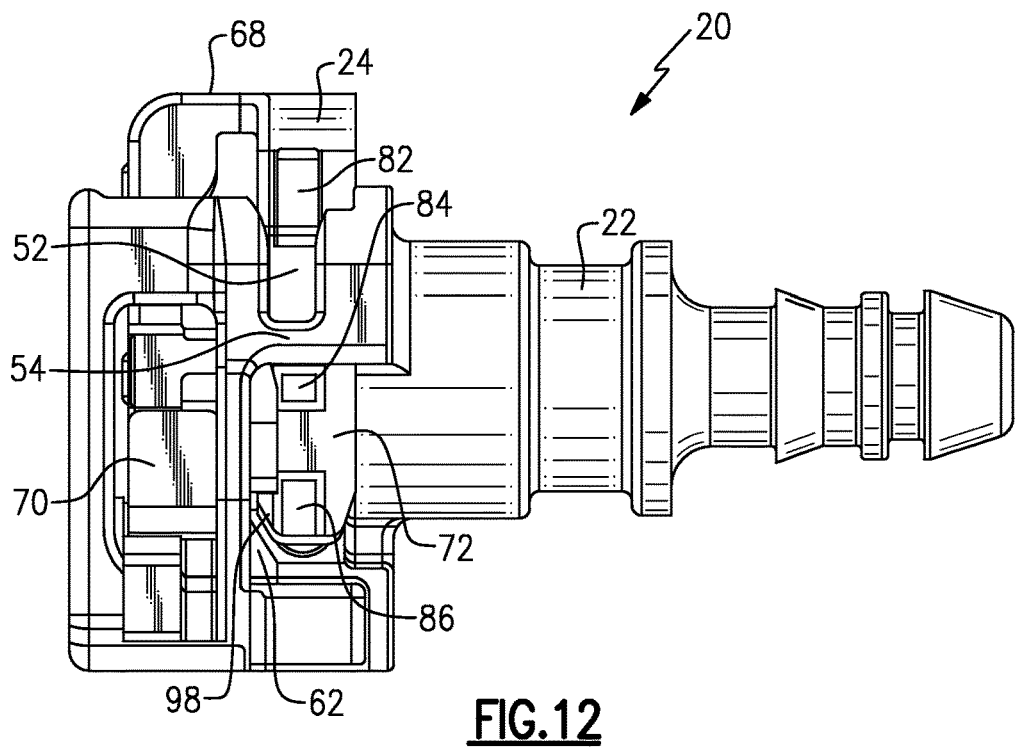
FIG. 12 illustrates a side view of the quick connect assembly in a shipping position.
Figure 13:
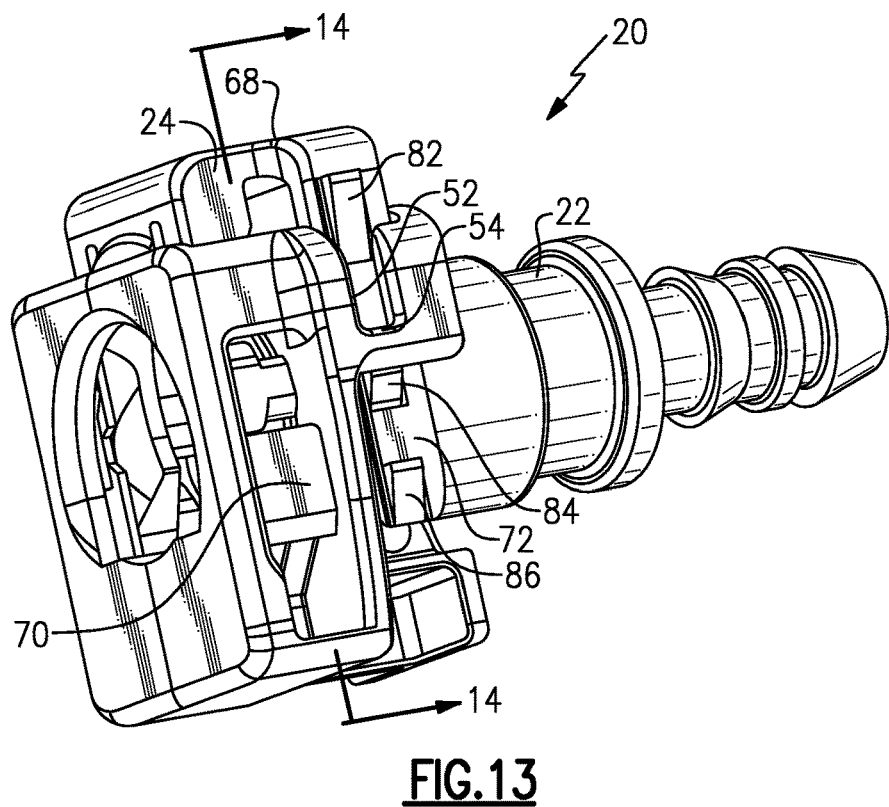
FIG. 13 illustrates a perspective view of the quick connect assembly in the shipping position.
Figure 14:
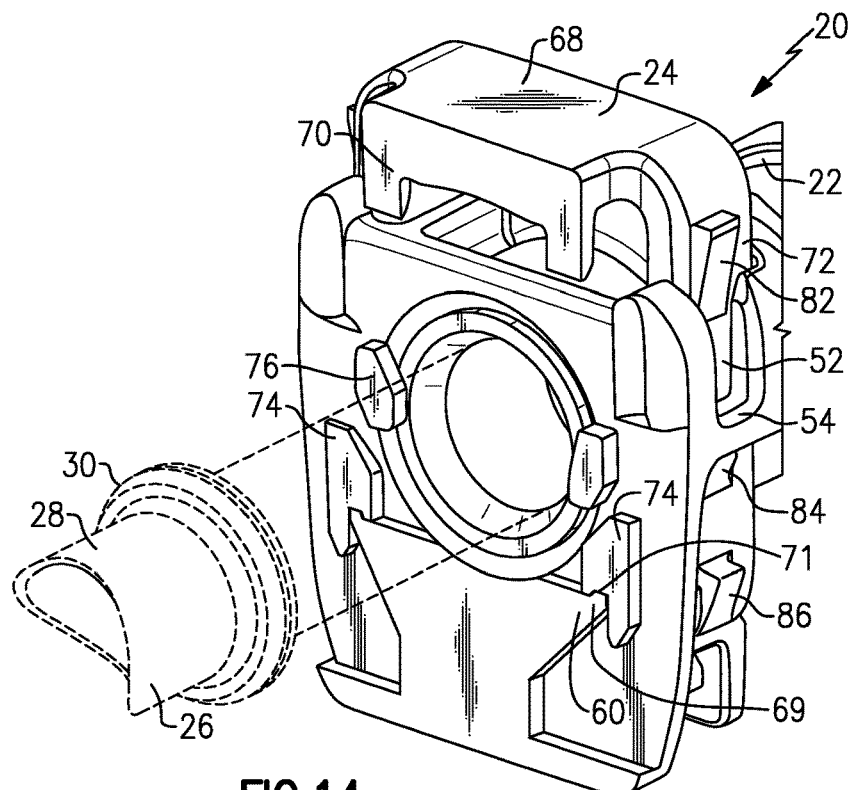
FIG. 14 illustrate a cross-sectional perspective view of the quick connect assembly in the shipping position taken along line 14-14 of FIG. 13 with the endform shown in phantom.
Figure 15:
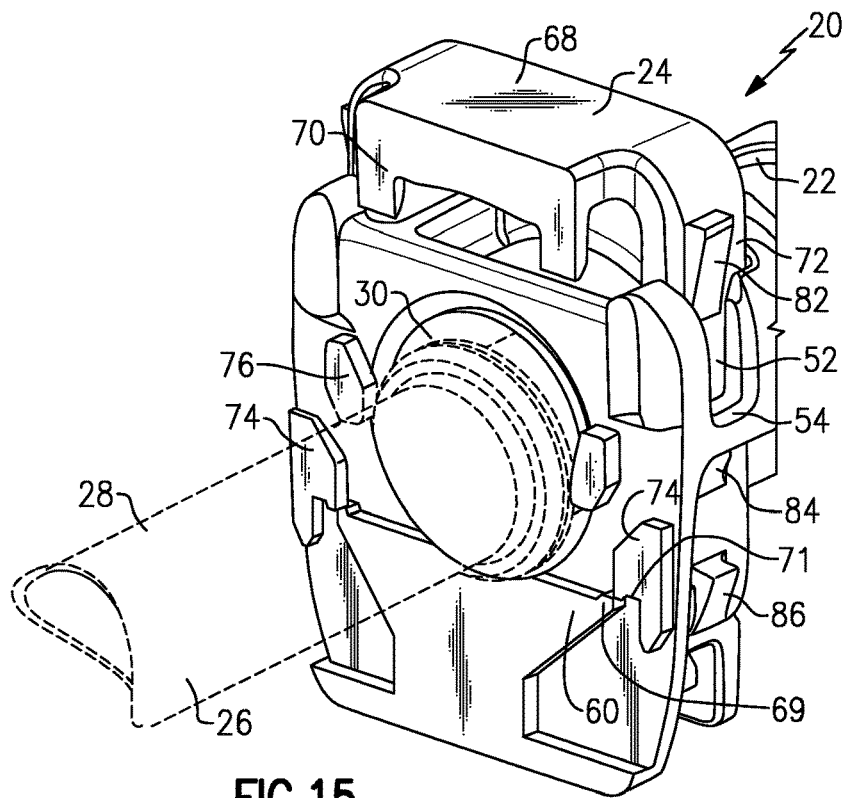
FIG. 15 illustrates a cross-sectional perspective view of the quick connect assembly in the shipping position when a bead of the endform engages and biases outwardly the retainer arms of the retainer/verifier.
Figure 16:
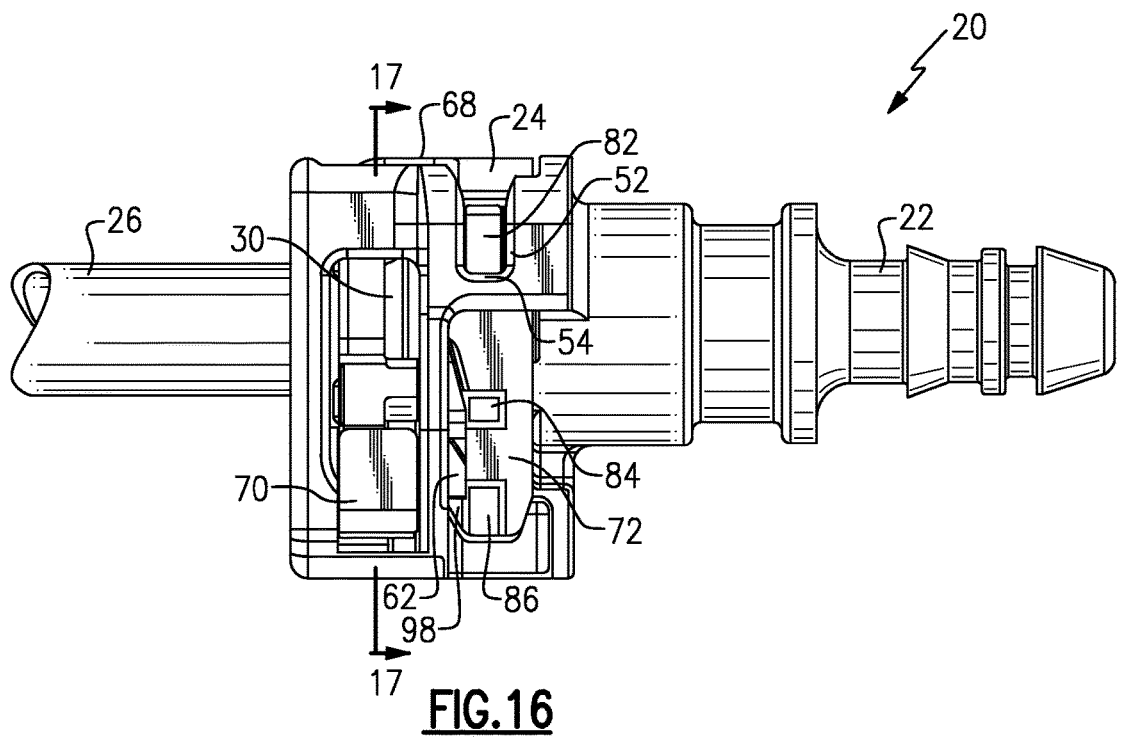
FIG. 16 illustrates a side view of the quick connect assembly in the engaged position.
Figure 17:
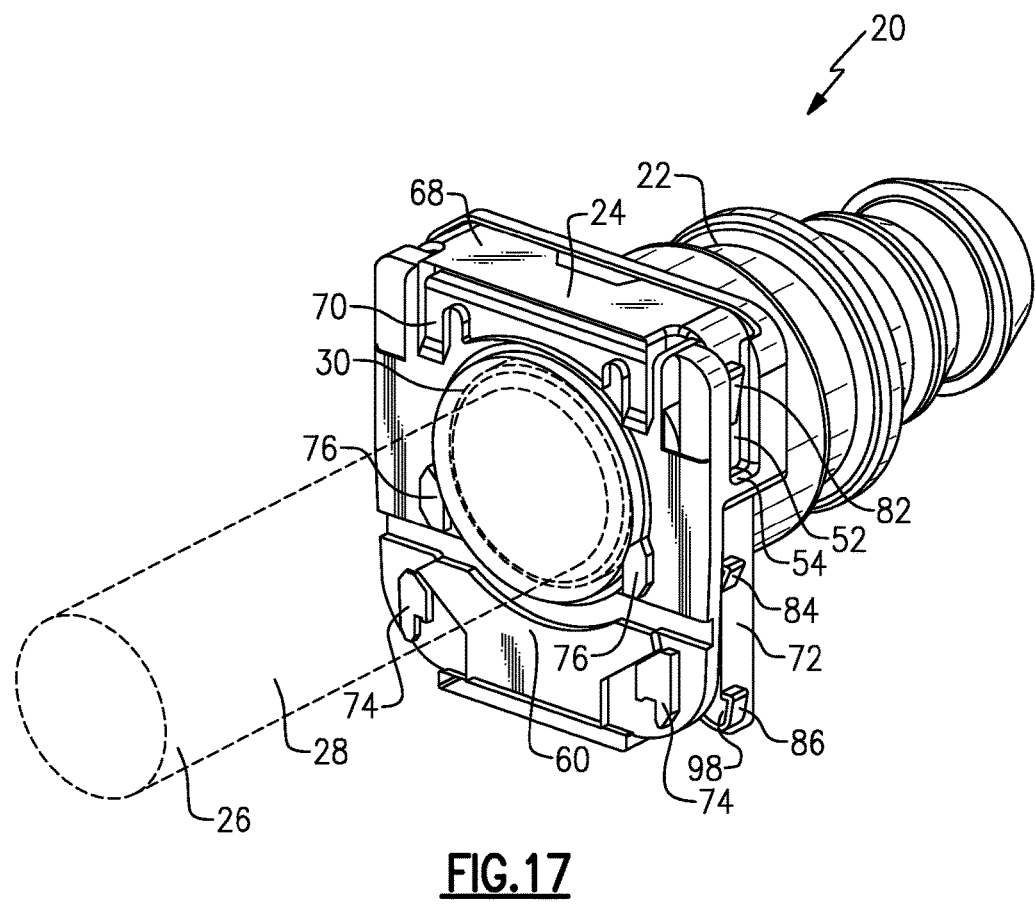
FIG. 17 illustrates a cross-sectional perspective view of the quick connect assembly in the engaged position taken along line 17-17 of FIG. 16.

FIGS. 10 and 11 show the quick connect assembly 20 in a service position. The retainer arms 70 are located in the spaces 44, and the guiding legs 72 are located in the spaces 48. The retainer/verifier 24 is positioned relative to the housing 22 such that the flanges 50 are located between the second detent 84 and the third detent 86.

FIGS. 12 to 15 show the quick connect assembly 20 in a shipping position. The retainer/verifier 24 is pushed downwardly relative to the housing 22 such that the flanges 50 are located between the first detent 82 and the second detent 84. Both the projections 69 of the stop 60 on the front side of the second portion 38 of the housing 22 engage in the recesses 71 in the hooked projections 74 of the retainer arms 70 (portions of the retainer arms 70 are not shown in FIG. 14), preventing the retainer/verifier 24 from moving into an engaged position shown in FIGS. 1 and 16 to 18.

The endform 26 is inserted into the passage 32, and the bead 30 engages the chamfered surface 75 of the retainer arms 70 of the retainer/verifier 24, causing the retainer arms 70 to bias outwardly. When the bead 30 engages the upset encountering tab 76, the retainer arms 70 bias outwardly, causing the projections 69 of the stops 60 to disengage from the recesses 71 of the hooked projections 74 (shown in FIG. 15). This then allows the retainer/verifier 24 to move downwardly to the engaged position shown in FIGS. 1 and 16 to 18.

When the retainer/verifier 24 is moved to the engaged position, the guiding legs 72 are moved downwardly such that the first detent 82 is received in the slot 52 of the flange 50 and above the lower surface 54. The ramped surface 100 of the detent 98 of each guiding leg 72 travels along the ramped surface 64 of the detents 62 of the housing 22. The locking surface 102 of the detent 98 of the retainer/verifier 24 then engages the locking surface 66 of the detent 62 of the housing 22 to prevent the removal of the retainer/verifier 24 from the housing 22 in an upwardly direction. Once the bead 30 passes through the retainer arms 70 of the housing 22, the retainer arms 70 bias inwardly to their original position, securing the endform 26 in the housing 22.

Figure 18:
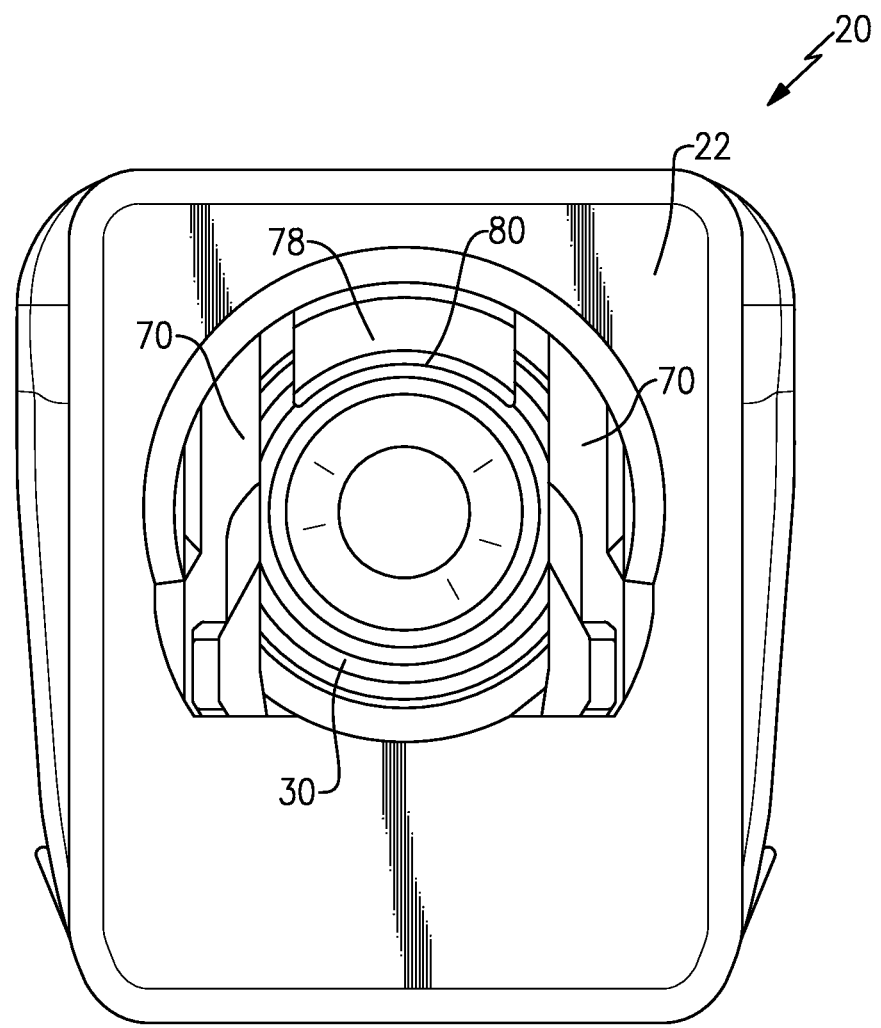
FIG. 18 illustrates a front view of the quick connect assembly in the engaged position.

As shown in FIG. 18, when the quick connect assembly 20 is in the engaged position, the curved lower surface 80 of the beam 78 of the retainer/verifier 24 is positioned axially in front of the bead 30 of the endform 26. The beam 78 provides a redundant latch with a single push lock to prevent removal of the endform 26 from the housing 22 of the quick connect assembly 20.

Figure 19:
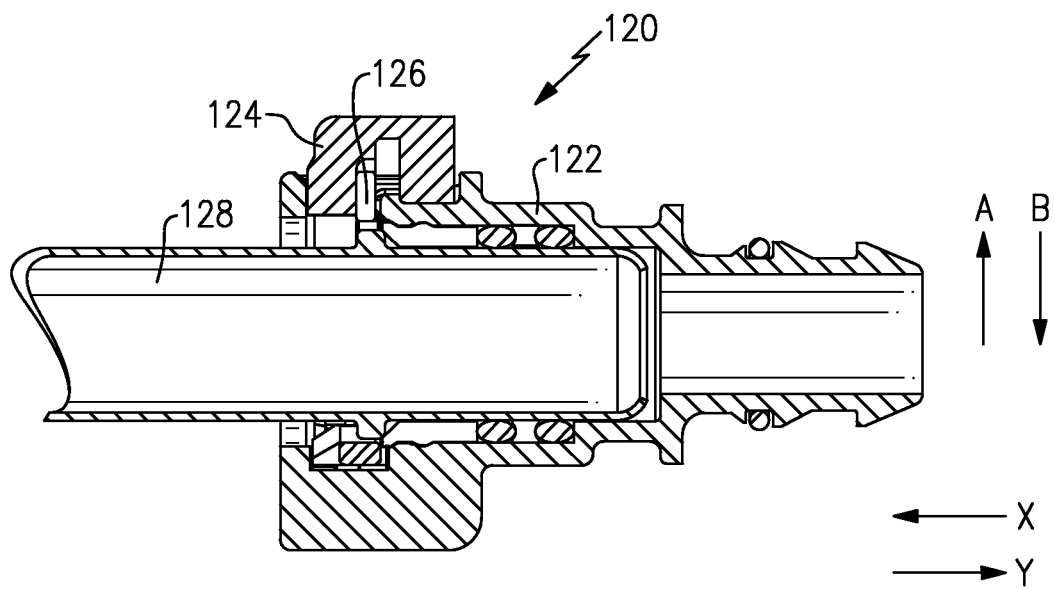
FIG. 19 illustrates a cross-sectional side view of a second quick connect assembly in a shipping position.
Figure 20:
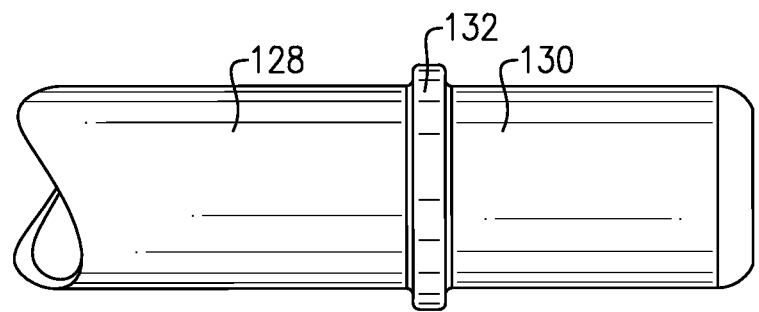
FIG. 20 illustrates a side view of an endform.
Figure 21:
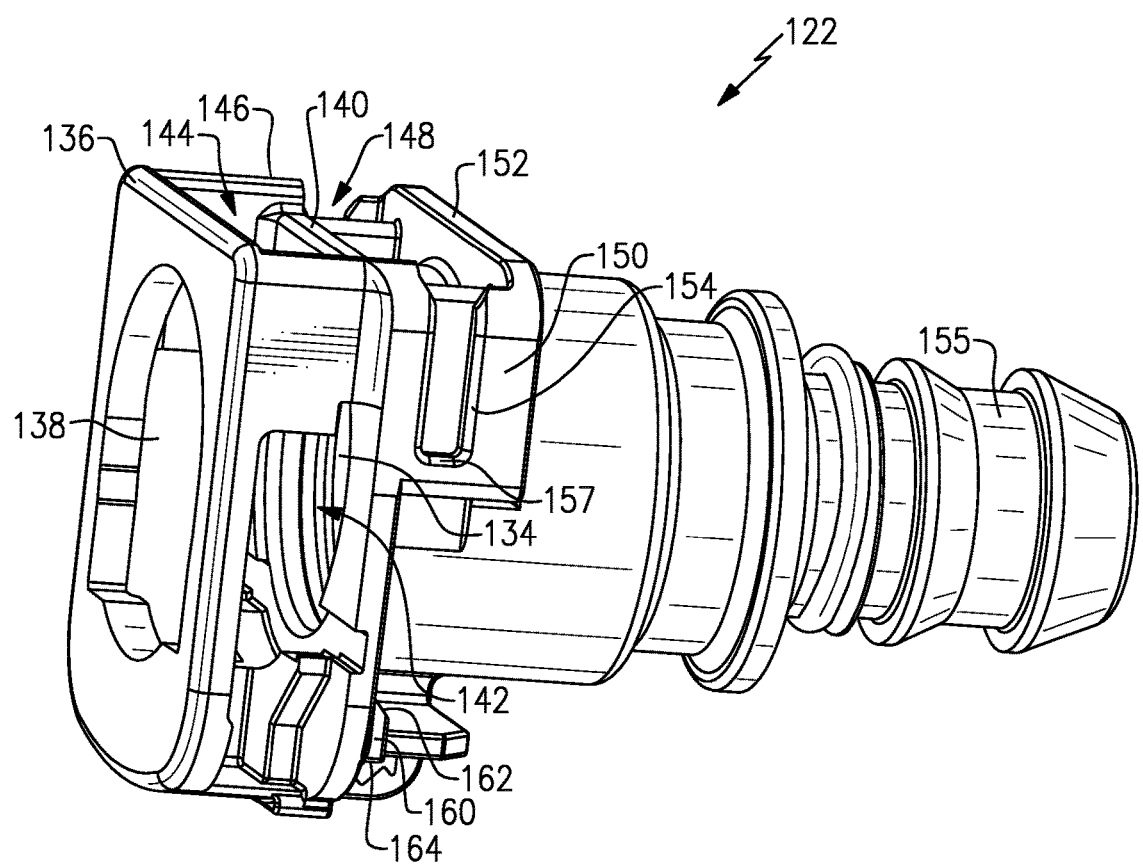
FIG. 21 illustrates a perspective view of a housing of the second quick connect assembly.
Figure 22:
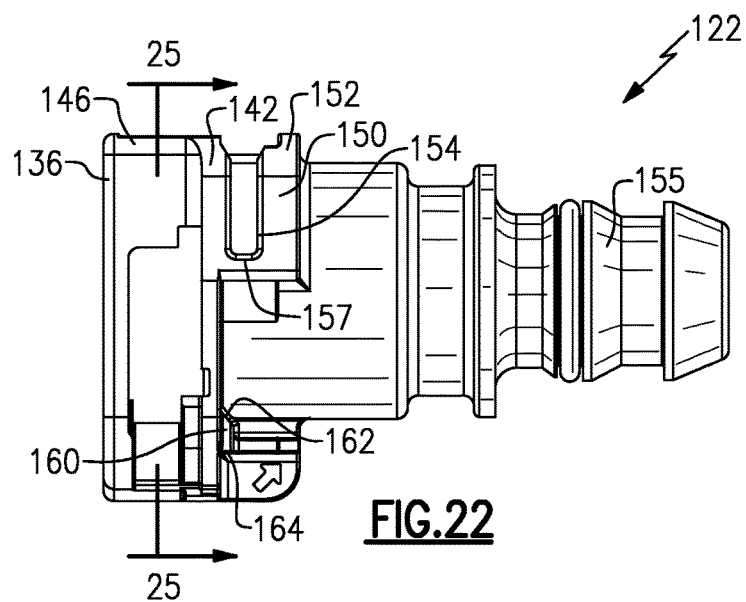
FIG. 22 illustrates a side view of the housing.
Figure 23:
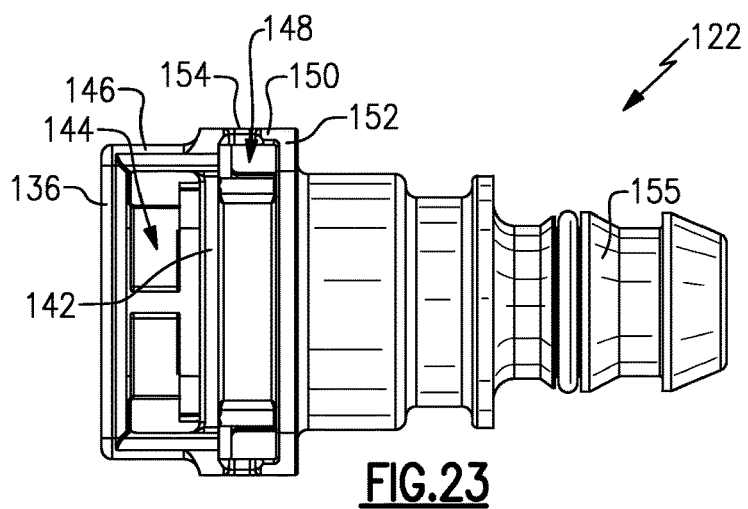
FIG. 23 illustrates a top view of the housing.
Figure 24:
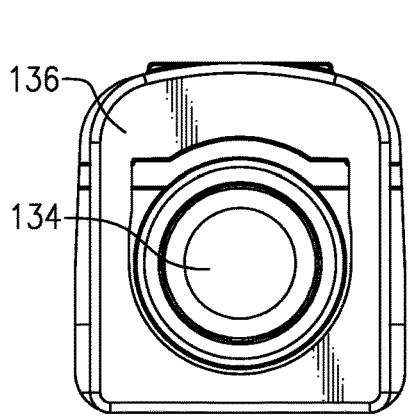
FIG. 24 illustrates a front view of the housing.
Figure 25:
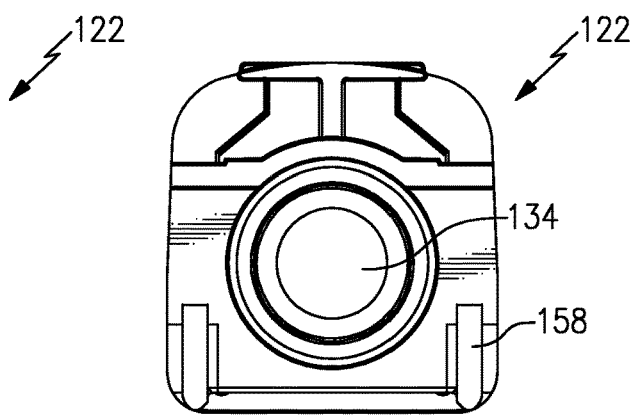
FIG. 25 illustrates a cross-sectional front view of the housing taken along line 25-25 of FIG. 22.
Figure 26:
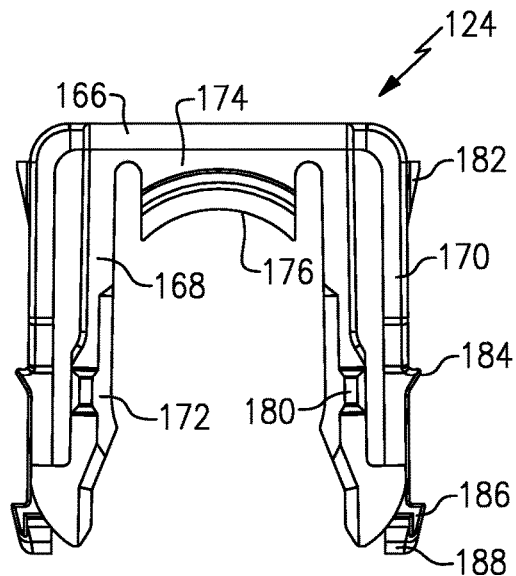
FIG. 26 illustrates a front view of a retainer of the second quick connect assembly.
Figure 27:
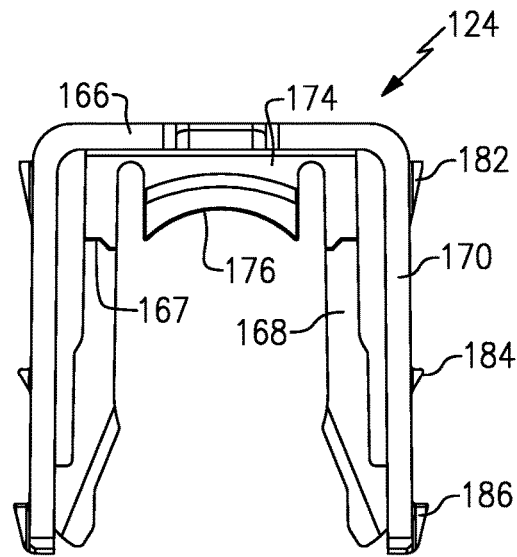
FIG. 27 illustrates a rear view of the retainer.
Figure 28:
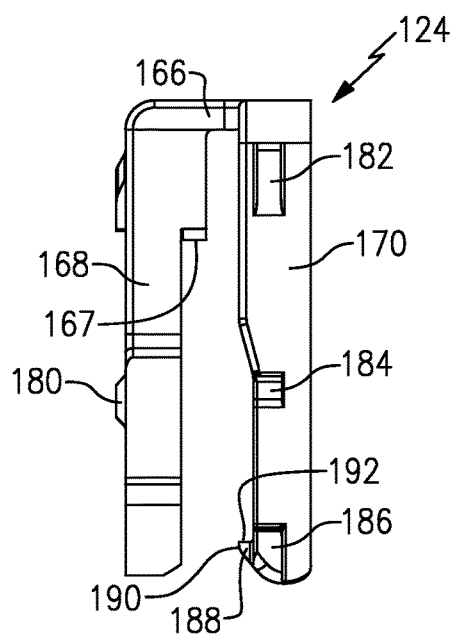
FIG. 28 illustrates a side view of the retainer.
Figure 29:
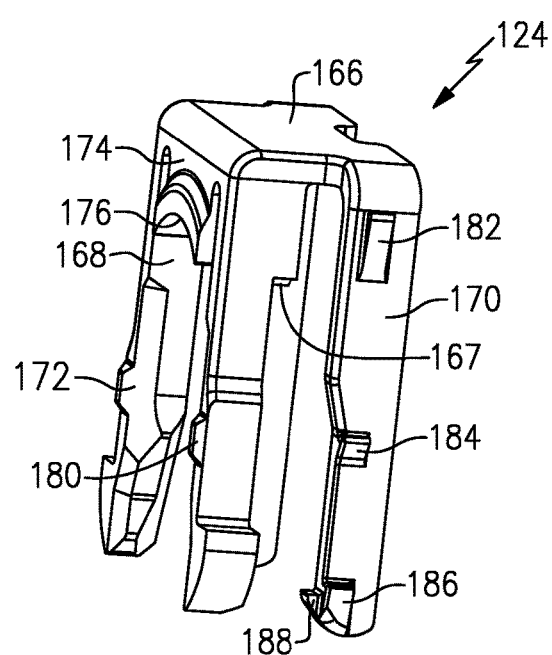
FIG. 29 illustrates a perspective view of the retainer.

FIG. 19 illustrates another quick connect assembly 120 in a shipping position. The quick connect assembly 120 includes a housing 122, a retainer 124, a verifier 126, and an endform 128. The retainer 124 secures the endform 128 in the housing 122. The directions rearward is defined the direction X, and the direction forward is defined as the direction Y. The direction upward is defined as the direction A, and the direction downward is defined as the direction B. As shown in FIG. 20, the endform 128 includes a tubular body 130 and an annular bead 132.

FIGS. 21 to 25 illustrate the housing 122. The housing 122 includes a passage 134 that receives the endform 128. The housing 122 includes a first portion 136 having a first opening 138 that is attached to a second portion 140 having a second opening 142. The openings 138 and 142 are aligned with the passage 134 to receive the endform 128. The first portion 136 is spaced axially in front of the second portion 140, and a space 144 is defined therebetween.

The first portion 136 and the second portion 140 are connected by flanges 146. The housing 122 also includes a third portion 152 that is connected to the second portion 140 by flanges 150 to define a space 148 on each side of the passage 134. Each of the flanges 150 includes a slot 154 that extends to a lower ledge 157.

The housing 122 also includes a stem 155 that is receivable in a plastic tube or a rubber hose (not shown). A substantially triangular detent 160 is located on each side of passage 134 on a back side of the second portion 140. Each detent 160 includes a locking surface 164 that is substantially perpendicular to the second portion 140 and a ramped surface 162 that extends upwardly from the locking surface 164 to the second portion 140. The locking surface 164 is located proximate to a bottom of the housing 122.

FIGS. 26 to 29 illustrate the retainer 124. The retainer 124 is a single, integral, monolithic unitary component made of a single component. The retainer 124 includes an upper flange 166, two retainer arms 168 extending downwardly from the upper flange 166, and two guiding legs 170 extending downwardly from the upper flange 166. The two retainer arms 168 are located inwardly of the two guiding legs 170.

The two retainer arms 168 each include a chamfered surface 172 on a front inner surface of each retainer arm 168 that can be engaged by the bead 132 of the endform 128 when inserted into the housing 122. A beam 174 having a curved lower surface 176 extends downwardly from the upper flange 166. Tabs 180 on a front surface of each retainer arm 168 of the retainer 124 prevent the endform 128 from pulling out when inserted. A back surface of each of the two retainer arms 168 includes a stop 167 near the curved lower surface 176.

The two guiding legs 170 each include an outer surface having a first detent 182, a second detent 184 and a third detent 186. The first detent 182 is located near the upper flange 166, the third detent 186 is located near an end of each guiding leg 170, and the second detent 184 is located between the first detent 182 and the third detent 186.

A front surface of each guiding leg 170 includes a substantially triangular detent 188 near the bottom of the guiding leg 170. The detent 188 includes a ramped surface 190 and a locking surface 192 perpendicular to the guiding leg 170. The locking surface 192 is located closer to the upper flange 166, and the ramped surface 190 extends downwardly towards the end of the guiding leg 170.

Figure 30:
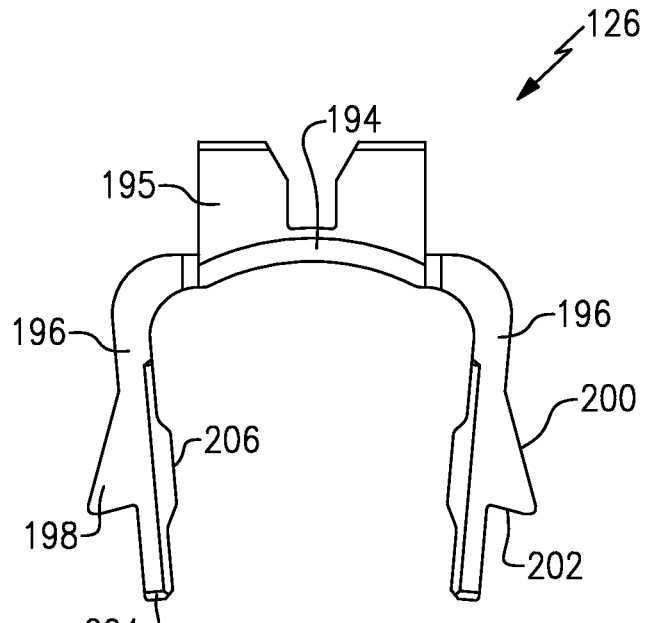
FIG. 30 illustrates a front view of a verifier of the second quick connect assembly.
Figure 31:
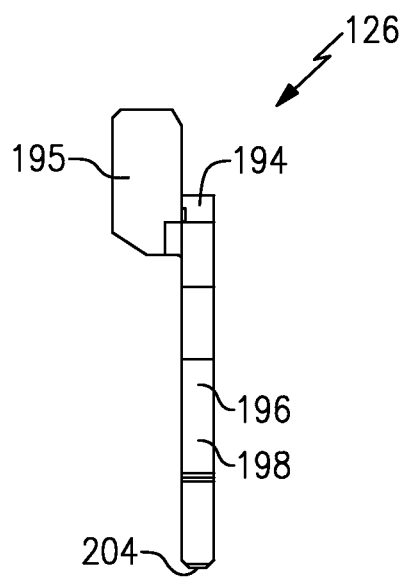
FIG. 31 illustrates a side view of the verifier.

FIGS. 30 and 31 illustrates the verifier 126. The verifier 126 includes a bridge 194 and two arms 196 that extend downwardly. Each arm 196 includes a substantially triangular stop 198 having a first angled surface 200 and a second angled surface 202. An end surface 204 is located at the end of each arm 196. An inner surface of each arm 196 includes an inwardly facing tab 206. Two flanges 195 extend upwardly from the bridge 134 and center the verifier 126 in the housing 122.

Returning to FIG. 19, in the shipping position, the retainer 124 cannot be pushed downwardly in the direction B until the endform 128 has been fully inserted into the housing 122. If the endform 128 is fully inserted, but the retainer 124 is not pushed downwardly, the quick connect assembly 120 will still function until service is performed.

Figure 32:
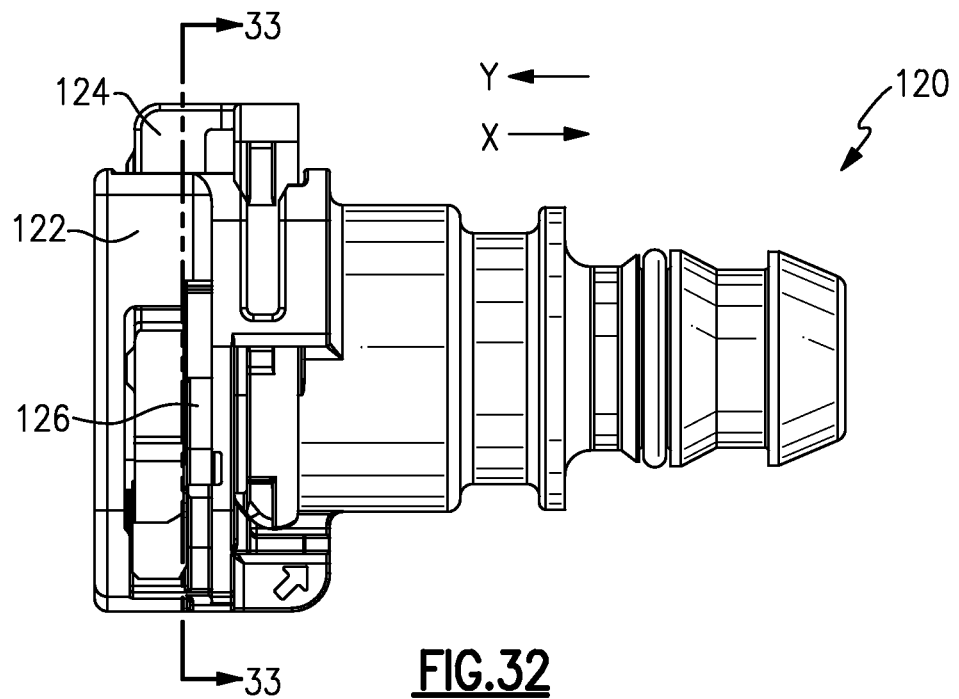
FIG. 32 illustrates a side view of the second quick connect assembly in a shipping position.
Figure 33:
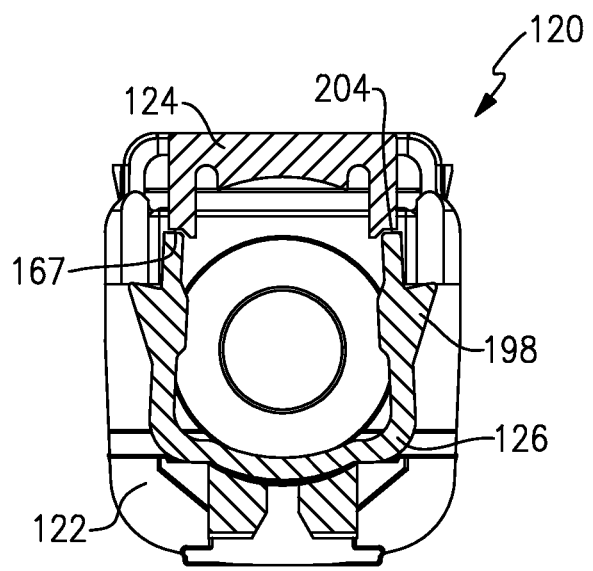
FIG. 33 illustrates a cross-sectional front view of the second quick connect assembly in the shipping position taken along line 33-33 of FIG. 32.

FIGS. 32 and 33 illustrate the quick connect assembly 120 in the shipping position. The verifier 126 is positioned in the housing 122 such that the end portions 204 each touches the stop 176 of the retainer 124. This contact prevents the retainer 124 from moving upwardly or downwardly.

Figure 34:
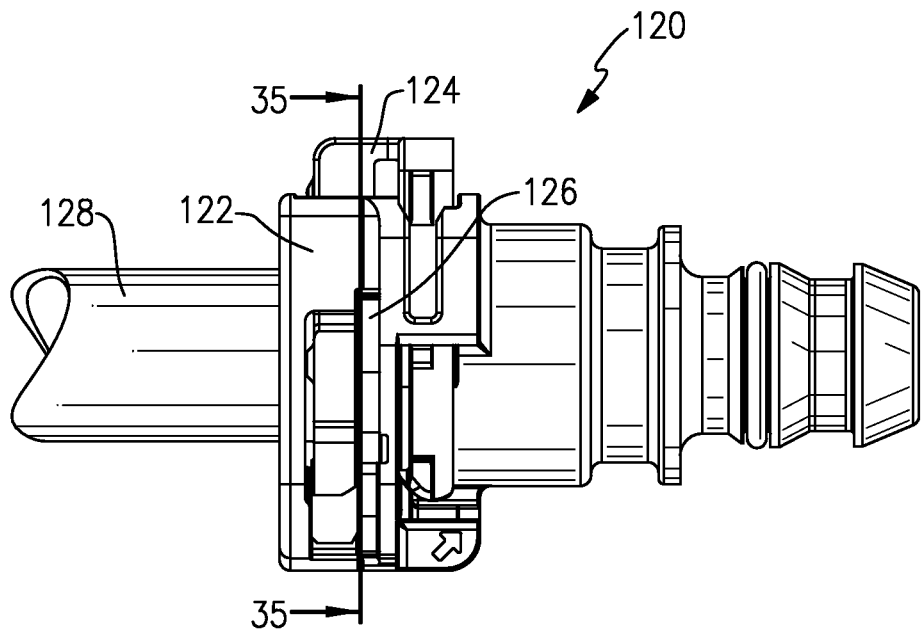
FIG. 34 illustrates a side view of the second quick connect assembly in the shipping position.
Figure 35:
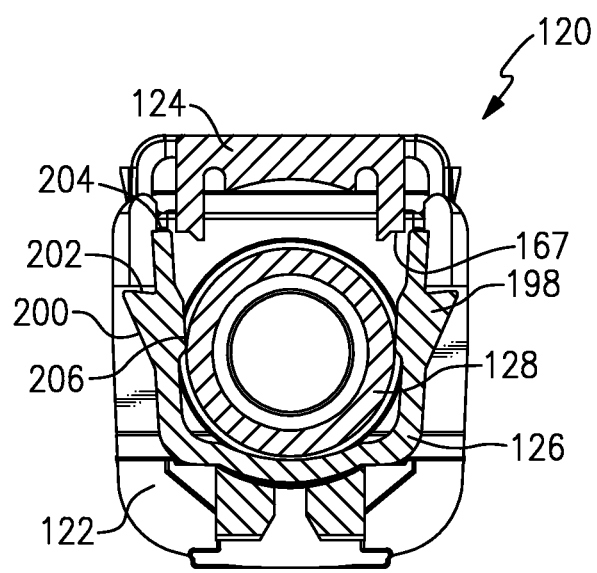
FIG. 35 illustrates a cross-sectional front view of the second quick connect assembly in the shipping position taken along line 35-35 of FIG. 34.

FIGS. 34 to 35 also illustrate the quick connect assembly 120 in the shipping position. When the endform 128 is inserted in to the passage 134, the bead 132 engages the chamfered surface 172 of the two retainer arms 168 of the retainer 124, causing the retainer arms 168 to bias outwardly. When the bead 132 of the endform 128 engages the inwardly facing tab 206 of the verifier 126, the arms 196 bias outwardly, releasing the end portion 204 of the verifier 126 from the stops 167 of the retainer 124.

Figure 36:
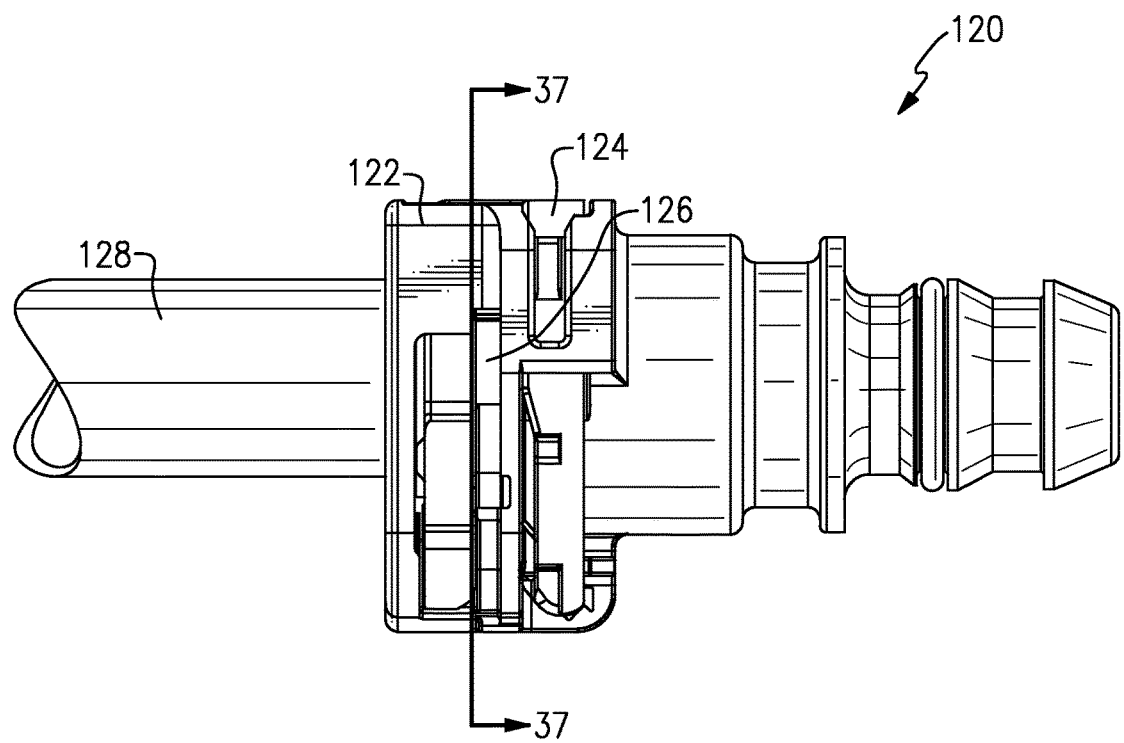
FIG. 36 illustrates a side view of the second quick connect assembly in an engaged position.
Figure 37:
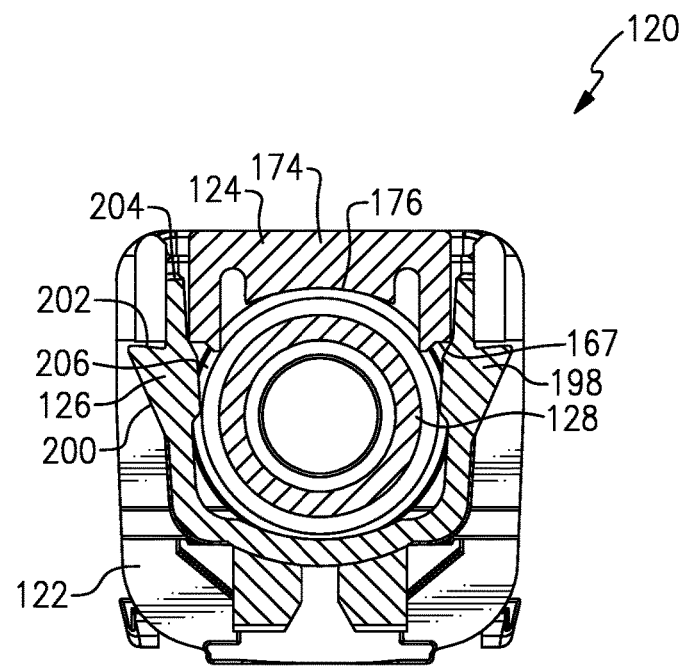
FIG. 37 illustrates a cross-sectional front view of the second quick connect assembly in the engaged position taken along line 37-37 of FIG. 36.

As shown in FIGS. 36 and 37, a force can then be applied downwardly to the retainer 124 to move to the engaged position. The locking surface 192 of the detent 188 of the retainer 124 engages the locking surface 164 of the detent 160 of the housing 122 to prevent the removal of the retainer 124 in an upward direction. Additionally, the curved lower surface 176 of the beam 174 of the retainer 124 is positioned axially in front of the bead 132 when the retainer 124 is in the engaged position to provide for a redundant latch with a single push lock.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. A fluid quick connector assembly comprising:
an endform having an annular bead;
a housing having a passage configured to receive the endform and slots that extend downwardly to lower surfaces; and
a retainer carried by the housing and translatable between a shipping position and an engaged position, the retainer including a bridge, a beam extending from the bridge, two retainer arms extending from the bridge to retain the endform in the passage of the housing when the retainer is in an engaged position, and two guiding legs extending from the bridge that guide the retainer during movement to the engaged position, the two guiding legs each comprising an upper detent near the bridge,
wherein the two guiding legs are elastically movable so as to permit passage of the bead of the endform and overlie the bead of the endform in the shipping position to provide a degree of protection against withdrawal of the endform in the shipping position,
wherein the slots receive the upper detents as the retainer is translated from the shipping position to the engaged position, and
wherein the beam contacts the bead of the endform when the retainer is moved from the shipping position to the engaged position and thereby provide a redundant latch to further prevent removal of the endform from the housing.

2. The fluid quick connector assembly of claim 1, wherein the housing includes a first portion, a second portion, and a third portion, wherein the first portion and the second portion are connected by first flanges with a first space defined therebetween, the second portion and the third portion are connected by second flanges with a second space defined therebetween, the two retainer arms are received in the first space, and the two guiding legs are received in second space, and
wherein the second flanges define the slots.

3. The fluid quick connector assembly of claim 2, wherein the second portion of the housing includes a stop and the two retainer arms each include a hooked projection that engages the stop of the housing to prevent the retainer from moving from the shipping position to the engaged position.

4. The fluid quick connector assembly of claim 3, wherein the two retainer arms of the retainer each include an upset encountering tab, and the annular bead of the endform engages the upset encountering tabs to bias the two retainer arms outwardly to remove the hooked projections from the stop to allow the retainer to move from the shipping position to the engaged position.

5. The fluid quick connector assembly of claim 4, wherein, when the retainer is in the engaged position, the two retainer arms bias inwardly to secure the endform in the housing.

6. The fluid quick connector assembly of claim 2, wherein the second portion of the housing includes a first detent and the two retainer arms of the retainer includes a second detent, and the first detent and the second detent engage to prevent removal of the retainer from the housing when the retainer is in the engaged position.

7. The fluid quick connector assembly of claim 2, wherein the two guiding legs each further include a lower detent at an end of each leg, and a middle detent located between the upper detent and the lower detent.

8. The fluid quick connector assembly of claim 7, wherein, when the retainer is in a service position, the second flanges are located between the middle detents and the lower detents, when the retainer is in a shipping position, the second flanges are located between the middle detents and the upper detents, and when the retainer is in the engaged position, the upper detents are received in the slots of the second flanges.

9. The fluid quick connector assembly of claim 1, wherein each of the two retainer arms includes a chamfered inner surface that is engaged by the annular bead of the endform.

10. The fluid quick connector assembly of claim 1, wherein the beam, the two retainer arms and the two guiding legs extend in a common direction.

11. The fluid quick connector assembly of claim 1, wherein the bridge, the beam, the two retainer arms, and the two guiding legs are an integral unitary single piece component.

12. A fluid quick connector assembly comprising:
an endform including a tubular body having an annular bead;

a housing having a passage configured to receive the endform, wherein the housing includes a first portion, a second portion, and a third portion, the first portion and the second portion are connected by first flanges with a first space defined therebetween, the second portion and the third portion are connected by second flanges with a second space defined therebetween, the second flanges defining downward slots; and a retainer carried by the housing and translatable between a shipping position and an engaged position, the retainer including a bridge, a beam extending from the bridge, wherein the beam has a curved lower surface, the retainer including two retainer arms extending from the bridge to retain the endform in the passage of the housing when the retainer is in an engaged position, and two guiding legs extending from the bridge that guide the retainer during movement to the engaged position, the two guiding legs each comprising an upper detent near the bridge, wherein the two guiding legs are elastically movable so as to permit passage of the bead of the endform and overlie the bead of the endform in the shipping position to provide a degree of protection against withdrawal of the endform in the shipping position, wherein the slots receive the upper detents as the retainer is moved from the shipping position to the engaged position wherein the beam contacts the endform when the retainer is moved from the shipping position to the engaged position, and the beam is positioned axially forward of the annular bead when the retainer is in the engaged position to provide a redundant latch to further prevent removal of the endform from the housing, wherein the two retainer arms are received in the first space of the housing, and the two guiding legs are received in second space of the housing.

13. The fluid quick connector assembly of claim 12, wherein the second portion of the housing includes a stop and the two retainer arms each include a hooked projection that engages the stop of the housing to prevent the retainer from moving from the shipping position to the engaged position.

14. The fluid quick connector assembly of claim 13, wherein the two retainer arms of the retainer each include an upset encountering tab, and the annular bead of the endform engages the upset encountering tabs to bias the two retainer arms outwardly to remove the hooked projections from the stop to allow the retainer to move from the shipping position to the engaged position.

15. The fluid quick connector assembly of claim 14, wherein, when the retainer is in the engaged position, the two retainer arms bias inwardly to secure the endform in the housing.

16. The fluid quick connector assembly of claim 12, wherein the second portion of the housing includes a first detent and the two retainer arms of the retainer includes a second detent, and the first detent and the second detent engage to prevent removal of the retainer from the housing when the retainer is in the engaged position.

17. The fluid quick connector assembly of claim 12, wherein the two guiding legs each further include a lower detent at an end of each leg, and a middle detent located between the upper detent and the lower detent.

18. The fluid quick connector assembly of claim 17, wherein, when the retainer is in a service position, the second flanges are located between the middle detents and the lower detents, when the retainer is in a shipping position, the second flanges are located between the middle detents and the upper detents, and when the retainer is in the engaged position, the upper detents are received in the slots of the second flanges.

19. The fluid quick connector assembly of claim 12, wherein each of the two retainer arms includes a chamfered inner surface that is engaged by the annular bead of the endform.

20. A fluid quick connector assembly comprising:

an endform having an annular bead;

a housing having a passage configured to receive the endform, the housing further including a stop and downward slots; and a retainer carried by the housing and linearly movable between a first position and a second position, the retainer including a bridge, a beam extending from the bridge, two retainer arms extending from the bridge, and two guiding legs extending from the bridge that guide the retainer during movement of the retainer from the first position to the second position, each of the two guiding legs including an upper detent near the bridge that is received by the slots when the retainer is in the second position, and each of the two retainer arms including a hooked projection that engages the stop of the housing to prevent the retainer from moving from the first position to the second position, the two retainer arms of the retainer each include an upset encountering tab for biasing the two retainer arms outwardly to remove the hooked projections from the stop to allow the retainer to move from the first position to the second position, wherein the two guiding legs cooperate with the annual bead of the endform in the first position to provide a degree of protection against withdrawal of the endform from the housing and the beam contacts the bead of the endform in the second position to provide a redundant latch to further prevent removal of the endform from the housing.

* * * * *